UNITED STATES PATENT OFFICE.

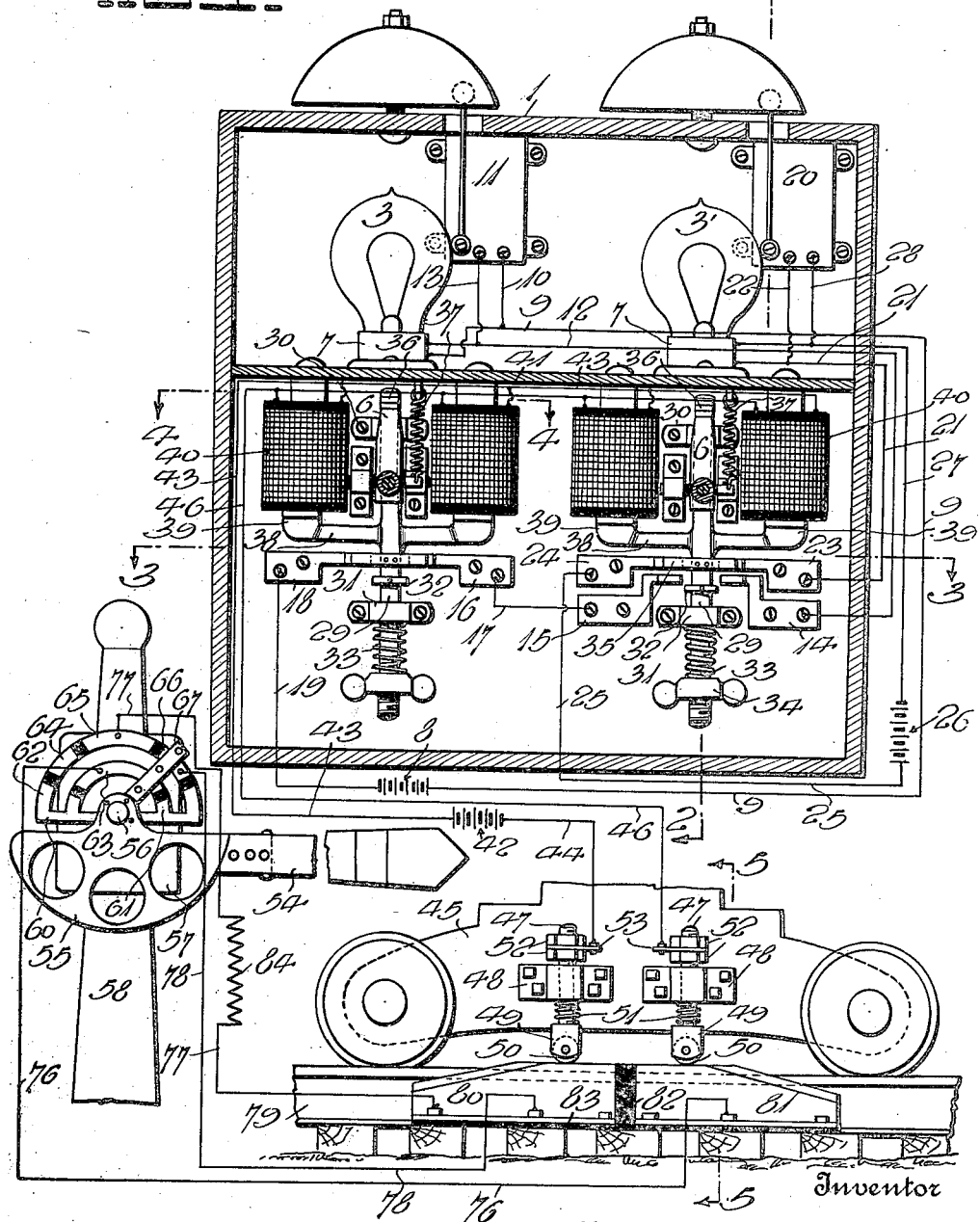

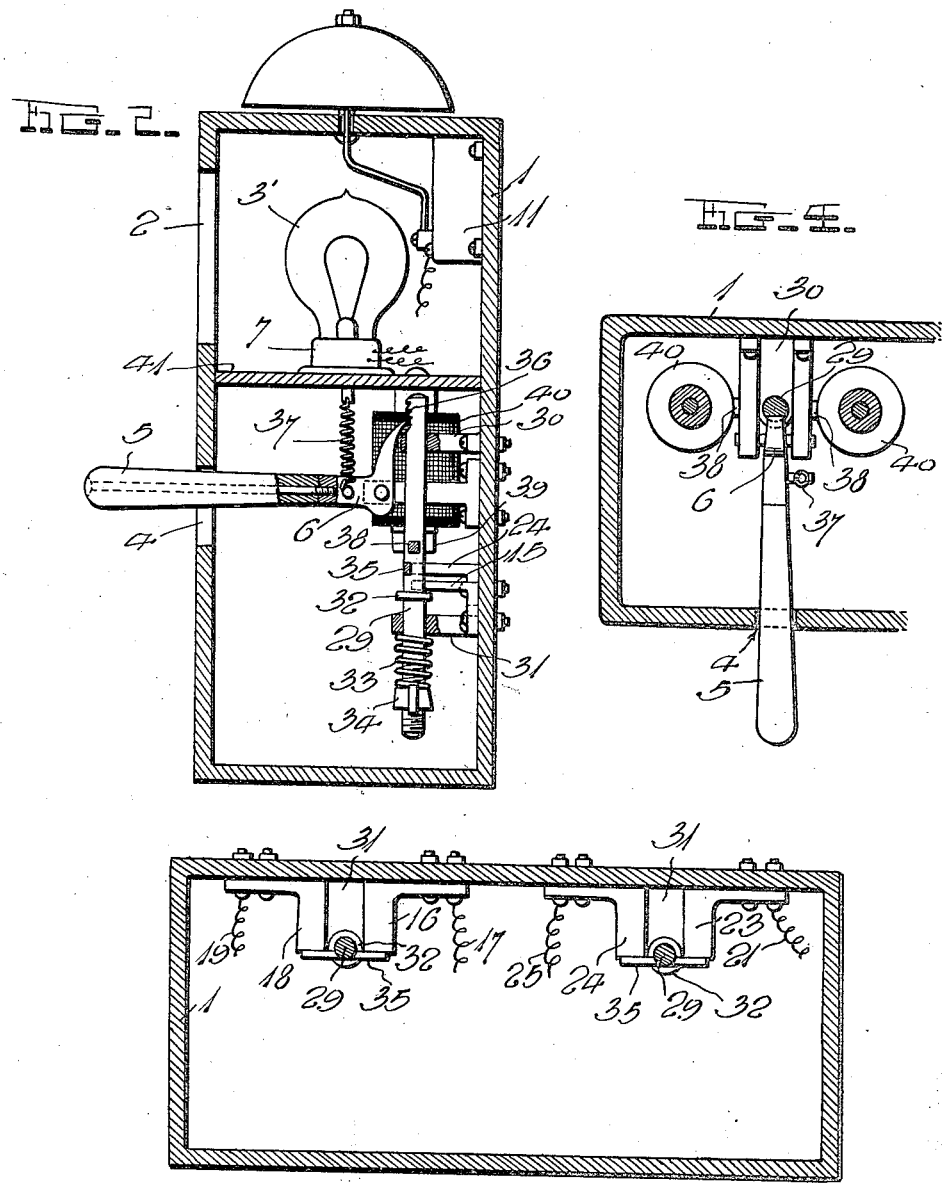

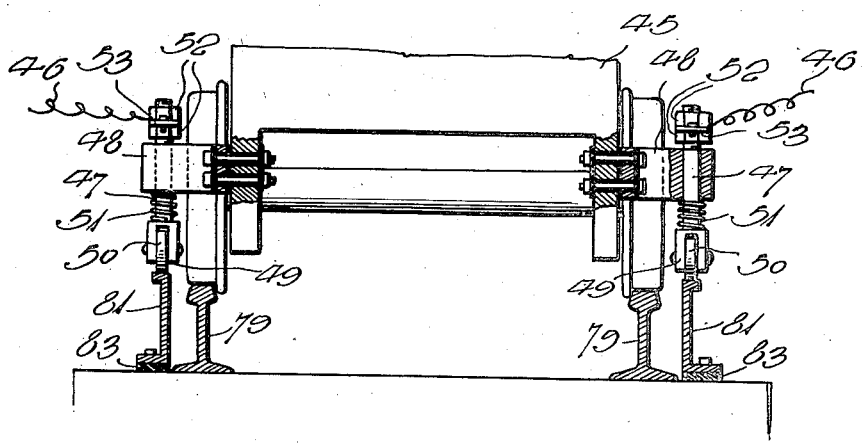
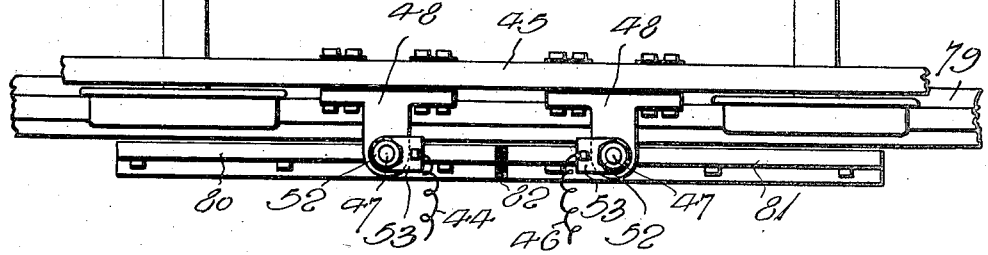
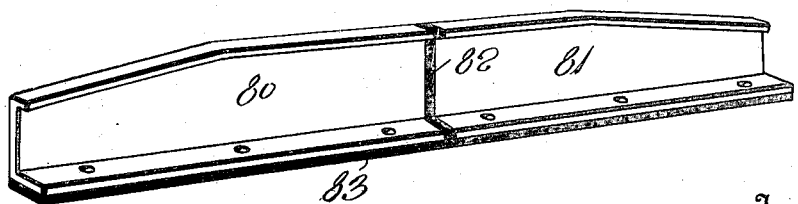

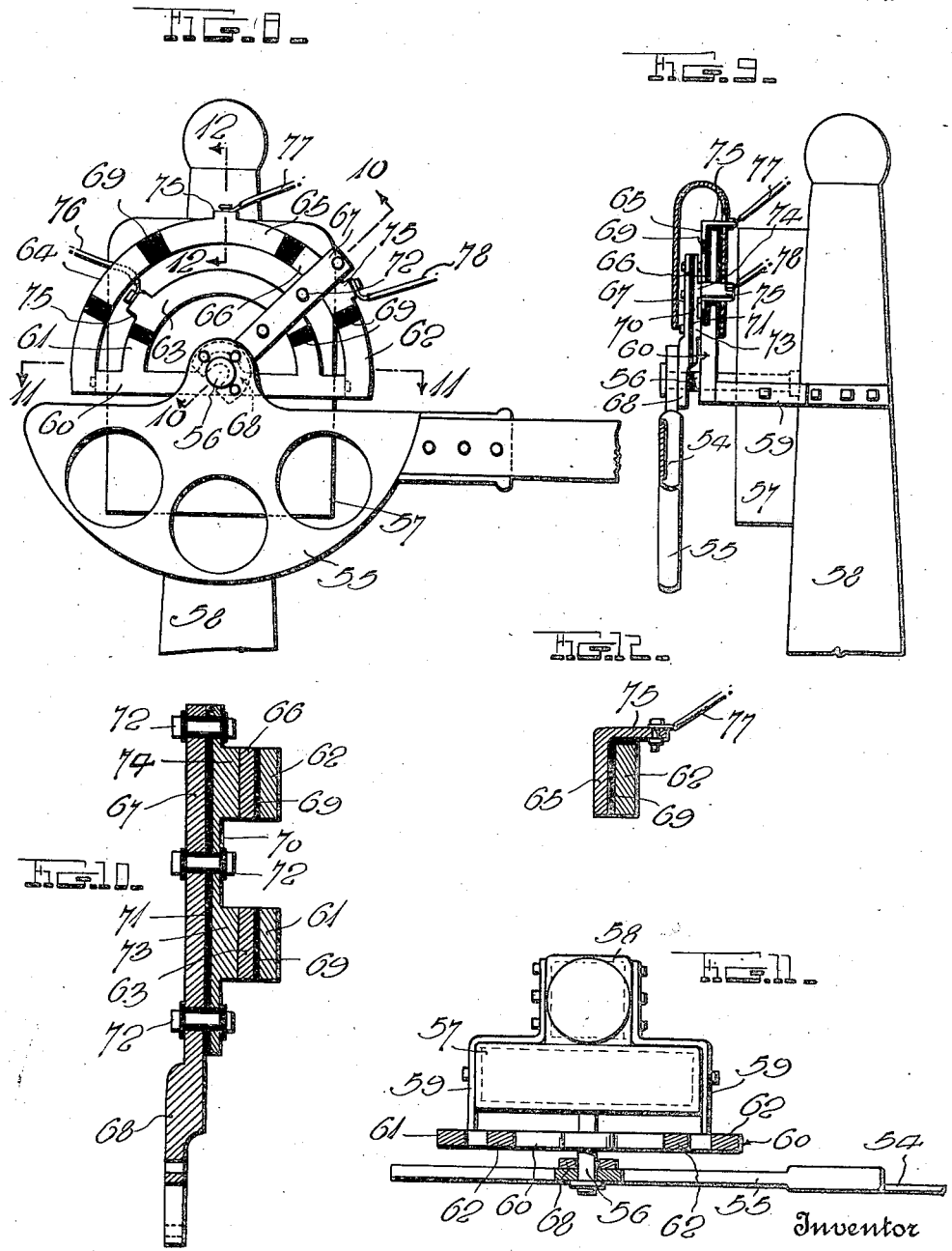

HARRY C. EIGABROADT, OF AMSTERDAM, NEW YORK.

SIGNAL-INDICATOR SYSTEM.

1,422,349.                    Specification of Letters Patent.    Patented July 11, 1922.

Application filed October 3, 1921. Serial No. 505,064.

*To all whom it may concern:*

Be it known that I, HARRY C. EIGABROADT, a citizen of the United States, residing at Amsterdam, in the county of Montgomery and State of New York, have invented certain new and useful Improvements in Signal-Indicator Systems; and I do declare the following to be a full, clear, and exact description of the invention, such as will enable others skilled in the art to which it appertains to make and use the same.

This invention relates to an improved signal indicator system for use upon railroad trains and other railways and one object of the invention is to provide a signal having a train element which can be mounted in the cab of the locomotive where the fireman and engineer can readily see it and which will be electrically operated and will indicate to the engineer and fireman when the train has passed a semaphore set at "danger" or "caution" and will indicate whether the semaphore is set for "danger" or for "caution".

Another object of the invention is to provide a signal of the character described having a train element which is so constructed that it will include a plurality of electrically operated indicators each having a circuit of its own, the circuits being closed by switch elements which are normally in an open position and will be moved to a closed position by electromagnets and one of the circuits including spaced contacts which will be bridged by the switch of the second circuit when this last mentioned switch is in the open position.

Another object of the invention is to provide a signal of the character described in which the train element has the magnets for moving the switches for both of the indicator energizing circuits included in a common circuit so that both of these switches may be simultaneously moved when desired, the switches being yieldably held against movement to a closing position by springs and the spring means of one of the switches being stronger than the second so that it takes a greater amount of current to move one switch than the other.

Another object of the invention is to provide a signal of the character described in which the circuit for energizing the magnet may be provided with spaced contact elements for engaging the insulated sections of a rail element, the insulated sections of the rail element being connected with terminals to be moved by a swinging arm or strip moved with the semaphore. In this construction, the semaphore arm is provided with a bridging strip which is gripped at all times engaging a terminal which is connected with one of the sections of the rail element and when moved can be selectively brought into engagement with terminal contacts which are connected with the second section of the rail element by means of conductors, one of which has a resistance intermediate its length so that the current can be cut down when passing through this particular conductor and only one of the switches of the indicator energizing circuit of the train element moved to a closing position.

Another object of the invention is to so construct the train element that the switches may be releasably held in a closed position, thus causing the signal to remain operative until the engineer or fireman has released the switches and permitted them to return to the open position.

Another object of the invention is to provide a signal of the character described in which the batteries for the various circuits may all be carried upon the train, thus making it unnecessary to provide batteries or other sources of electricity along the track and at the station.

Another object of the invention is to provide a signal of the character described which will be comparatively simple in its construction and will not be liable to readily get out of order and fail to operate.

This invention is illustrated in the accompanying drawings, wherein:

Figure 1 is a diagrammatic view of the complete apparatus.

Figure 2 is a vertical sectional view taken along the line 2—2 of Fig. 1.

Figure 3 is a transverse sectional view taken along the line 3—3 of Fig. 1.

Figure 4 is a sectional view taken along the line 4—4 of Fig. 1.

Figure 5 is a sectional view taken along the line 5—5 of Fig. 1.

Figure 6 is a top plan view of the track element and co-operating portions of the locomotive train element.

Figure 7 is a perspective view of the rail element.

Figure 8 is an enlarged view showing the semaphore in elevation and set at "danger."

Figure 9 is a view showing the structure of Fig. 8 looking at the right-hand side thereof.

Figure 10 is a sectional view taken along the line 10—10 of Fig. 8.

Figure 11 is a sectional view taken along the line 11—11 of Fig. 8.

Figure 12 is a sectional view taken along the line 12—12 of Fig. 8.

This improved signal indicator system includes a train element having a box or housing 1 which will have its forward wall provided in its upper portion with openings 2 in front of the lamp bulbs 3 and 3′ and will be provided with lower openings 4 positioned beneath the upper openings 2 so that the handles 5 of the latches 6 may extend through the front wall where they can be easily grasped by the engineer or fireman. The lamp bulbs are mounted in sockets 7 and these lamps 3 and 3′ are to be energized by means of separate circuits so that they may be independently illuminated. The circuit for the lamp 3 which will be termed the "caution" lamp includes a battery 8 having a conductor 9 leading therefrom and connected with the socket and having a branch wire 10 which is connected with a bell 11 the second wire of which leads from the socket of the lamp 3 and is provided with a branch wire 13 connected with the bell and is connected with a contact 14 which is positioned in spaced relation to a contact 15. This contact 15 is connected with a contact 16 by means of a conductor 17 so that current may pass from the contact 16 to the contact 15. This contact 16 is in spaced relation to a similar contact 18 which is connected with the battery 8 by means of a conductor 19. It will be readily seen that when the contacts 18 and 16 are connected and the contacts 15 and 14 connected by a bridge the circuit will be complete and the lamp 3 will be illuminated and the bell 11 will ring.

The circuit for the lamp 3′ and bell 20 includes a conductor wire 21 which leads from the socket of this lamp and is provided with a branch wire 22 which is connected with the bell. This wire 21 is connected with a contact 23 which is similar to the contacts 16 and 18 and is positioned in spaced relation to a contact 24 from which extends a wire 25 which is connected with the battery 26. It should be noted that the spaced contacts 23 and 24 are mounted directly above the spaced contacts 14 and 15 so that when the switch element which is to engage and bridge the contacts 23 and 24 is in an open or inoperative position it may engage and bridge the contacts 14 and 15. It will thus be seen that when the switch for the contacts 23 and 24 is in an open position and in bridging engagement with the contacts 14 and 15 and the switch for the contacts 16 and 18 is moved to the closed or operative position, the lamp 3 may be lighted. It will also be readily seen that when the switch is moved into engagement with the contacts 23 and 24 the lamp 3′ will be lighted and the lamp 3 will remain extinguished even though the switch of this circuit has been moved to a closed position together with the switch of the circuit of the lamp 3′. The second wire 27 which leads from the battery 26 is connected with the socket of the lamp 3′ and is provided with a branch wire 28 which is connected with the bell 20.

In order to bridge the space between the spaced contacts there has been provided switches, each of which is provided with a vertically disposed stem 29 which is slidably mounted in bearings 30 and 31 and carries an abutment collar 32 so that the stem cannot be moved downwardly beyond a desired amount under the action of the spring 33 which is positioned upon the lower end portion of this stem between the bearings 31 and the abutment nut 34 which is screwed upon the lower end portion of the stem. This stem carries a bridging arm 35 which extends upon opposite sides of the stem and is of such length that its end portions may engage the spaced contacts and thus bridge the space between them. The upper end portion of this stem is provided with rack teeth as shown at 36 which will be engaged by the latch 6 thus permitting the stem to be releasably but securely held in a raised or in other words, a closed or operative position until the latch has been moved against the action of the spring 37 to a releasing position. By providing this construction, the stem will be normally held in a depressed position with the latch open by means of the spring 33 and when raised against the action of the spring 33 the rack teeth 36 will slip past the pawl, thus permitting upward movement of the stem, but will be firmly engaged by the pawl and the stem thus securely held in a raised position until the latch is moved to the inoperative position by downward pressure upon the handle 5 of this latch. When this latch is moved to the inoperative position against the action of the spring 37, the spring 33 will again move the stem downwardly and open the switch.

In order to move the stem upwardly, each stem has been provided with side arms 38 which extend from the sides of the stem and are provided at their free ends with enlarged heads 39 positioned beneath the electromagnets 40 mounted upon opposite sides of the stem within the housing and beneath the partition 41 upon which rest the sockets 7. The electromagnets are positioned in a circuit including a battery 42 having a conductor wire 43 leading therefrom and provided with the usual branch wires which are connected with the windings of the electromagnets. The wire 44 which leads from the opposite end of the battery 42 is connected with a contact element mounted upon the truck 45 of the locomotive engine. A second contact similar to the one previously mentioned is carried by this truck 45 and engaged by the conductor wire 46 which is connected with the opposite ends of the windings for the electromagnets. Each of the contacts engaged by the conductor wires 44 and 46 is provided with a stem or plunger 47 which is slidably mounted in a bearing 48 and provided at its lower end with a head 49 in which is mounted a roller 50. A spring 51 is provided to yieldably hold the plunger 47 against upward movement and securing nuts 52 are screwed upon the upper end portion of this plunger to limit downward movement of the plunger and also serve as means for securing the wire terminals 53. It will thus be seen that the circuit for the electromagnets will be an incomplete circuit and a completing circuit will be necessary before the current can be passed through the electromagnets. It is this completing circuit which is opened and closed by the semaphore arm and it will be readily seen that when the completing circuit is open a train may pass the semaphore arm without the signal means of the cab being effected, whereas with the completing circuit closed, the signal means will be operated as will be hereinafter brought out.

The semaphore is of a conventional construction and is provided with the usual arm 54 which is carried by the usual base or block 55 pivotally mounted upon a stem 56 carried by the block 57 which is connected with the semaphore pole 58 by means of bracket strips 59 which also serve to support the bracket 60. The bracket 60 is semi-circular in shape and is provided with inner and outer semi-circular strips 61 and 62 which have portions set back to provide seats in which will be seated contact strips 63, 64, 65 and 66 which are to be engaged by a bridging strip 67 secured upon the base 55 adjacent the pivot point thereof by means of bolts or other fasteners which pass through the base and through the forked end portion 68 which straddles the pivot stem 56. The contact strips 63, 64, 65 and 66 are insulated from the semi-circular strips 61 and 62 as shown at 69 so that current will be prevented from passing from these contact plates or strips to the strips 61 and 62 and thus a short circuit prevented. The bridging strip 67 is provided with a facing strip 70 which extends longitudinally of the bridging strip and is insulated therefrom as shown at 71 and secured by fastener bolts 72. This facing strip is thickened to provide block extensions 73 and 74 for engaging the contacts carried by the inner and outer strips 61 and 62. From an inspection of Figs. 1 and 8 it will be seen that the bridging strip extends at such an angle with respect to the semaphore arm 54 that when this arm is in the lowered or "danger" position, this bridging strip will engage the contacts 66 whereas when the semaphore arm is in the "safety" or upright position, it will engage the contact strip 64. When midway between the two positions, or in other words in "caution" position, this bridging strip will engage the contact 65. The contacts 63, 65 and 66 are provided with arm extensions 75 which extend across the strips 61 and 62 as shown in Fig. 12 and are connected with the conductor wires 76, 77 and 78. These conductor wires lead to the rail element which is mounted upon the ties adjacent the rails 79 of the track so that when the train moves over the track the terminals 53 of the wires 44 and 46 will engage the rail elements. From an inspection of Fig. 5 it will be seen that one of these rail elements can be positioned adjacent each rail of the track and duplicate terminal provided upon opposite sides of the engine so that the device can be operated by a train moving in either direction and so that operation will be insured in case the terminals or the rail elements upon one side should be rendered inoperative for any reason. The rail element is in the form of a rail member formed in two sections 80 and 81 which are insulated from each other and from the ties and rail 79 as shown at 82 and 83. The rail or track element extends above the rails 79 so that the terminals of the wires 44 and 46 will not have a tendency to strike the rails of the track when going over a switch.

The end portions of the rail sections 80 and 81 are sloped as shown clearly in Fig. 7 thus permitting the rollers 50 to easily move onto and off of the track element. It should be noted that the sloping of the rail sections reduces the horizontally disposed upper edge portions to such an extent that one roller 50 passes over the rail section 80 and reaches the insulation 82 before the second roller engages the rail section 80 and that before the second roller reaches the section 81, the first roller has passed out of engagement with the rail section 81. Therefore, both rollers will not at any time be in engagement with the same rail section and closing of the circuit for the electro-magnet by one of the rail sections will be prevented. The wire 76 is connected with the section 81 and the wires 77 and 78 are connected with the section 80. It will thus be seen that with the semaphore arm set at "caution" or "danger" the wire 76 will be connected with one of the wires 77 and 78 according to the position of the semaphore arm to the bridging strip 67 and therefore when one of the rollers 50 has passed over the rail section 80 and engaged the rail section 81 and the second roller moved into engagement with the rail section 80 of the track element as shown in Fig. 1 the circuit for the magnets will be completed. When, however, the semaphore is at "safety" and the bridging strip is engaging the strip 64, the circuit will be broken since there is no wire leading from the strip 64 and the two rollers do not at any time both engage the same rail section. It should be noted that a resistance 84 is cut in intermediate the length of the wire 77 so that when the current is passing through this wire 77 it will be cut down and will not have strength enough to move the stem of the switch for the circuit controlling the lamp 3' against the action of the spring which is placed upon this stem of the switch controlling this circuit.

When this apparatus is in use and the semaphore arm is set for "danger" as shown, the bridging strip 67 extends from the strip 63 to the strip 66 and thus the wire 76 which leads from the section 81 of the track elements is connected with the wire 78 leading from the section 80 of the track element. When the train passes the "danger" signal without the engineer or fireman noticing it, the rollers 50 will move across the track element and when they are both in engagement with the rail sections with one engaging the rail section 80 and the other engaging the rail section 81 as shown in Fig. 1 the circuit for energizing the magnets will be closed and the magnets will be energized and the stems of the switches drawn upwardly against the action of the springs 33 and held in the raised position by the latches 6 until these latches are moved to the inoperative position by the engineer or fireman grasping the handle 5 and moving the latches to a releasing position. When the switches are in the raised position, the contacts 16 and 18 will be connected or bridged by the side arm of the switch stems of the lamp 3 and the side arm of the stem for the lamp 3' will move out of engagement with the contacts 14 and 15 and move into engagement with the contacts 23 and 24. The contacts 14 and 15 will thus be left in spaced relation so that the lamp 3 will not be energized and the bell 11 will not ring but the circuit for the lamp 3' and bell 20 will be completed and this lamp which will preferably be a red lamp will be lighted and the bell 20 will continue to ring until the latch is released by the engineer or fireman.

When the semaphore arm is set at "caution" the bridging strip connects the contact strip 63 with the contact strip 65 and wire 76 is thus connected with the wire 77. This wire 77 has the resistance 84 cut into it and therefore when the current passes through this wire 77 its strength will be reduced and although the magnet will be energized when the rollers 50 are in the position shown in Fig. 1 the magnet for the switch of the circuit for lamp 3' will not have sufficient strength to move the stem of this switch upwardly against the action of the relatively strong spring carried by this stem. Therefore, the side arms of this stem will remain in engagement with the contacts 14 and 15 and when the switch of the circuit for the lamp 3 is moved upwardly to engage the contacts 16 and 18 the circuit to the lamp 3 and bell 11 will be completed and this lamp which will preferably be colored green or yellow to distinguish it from the red danger lamp 3' will be illuminated. It will thus be seen that by this construction, the two lamps may be individually lighted according to whether the semaphore arm is set for "danger" or for "caution" and that the engineer or fireman will be warned when they have passed a set signal. It will be further noted that the warning lamp will continue to burn and the warning bell continue to ring until the circuit for the energized lamp and bell has been broken and the switch or switches returned to the normal position. If the signal is set at "safety" with the bridging strip engaging the insulated strip 64 the passage of current from the wire 76 to the wires 77 and 78 will be prevented and as the train passes over the track element, the energizing circuit for the magnets will remain dead.

I claim:

1. A safety device including a semaphore, a track element including insulated contacts, a bridging strip movable with said semaphore, a main contact engaged by said bridge strip and connected with one of the contacts of the track element, insulated contacts engageable by said bridging strip and connected with the second contact of the track element, a resistance being provided between the second contact of the track element and one of the last mentioned contacts, and a train device comprising electrically operated indicators, energizing circuits for the indicators, switch means for the circuits, resilient means yieldably holding the switch means against movement in one direction, the resilient means of one switch being stronger than the other, electrically operated means for moving said switch means having an energizing circuit including spaced contacts for engaging the contacts of the track element, and means for releasably holding the switches against return movement by said resilient means after being moved by the electrically operated means.

2. A safety device including a semaphore, a track element including insulated contacts, a bridging strip movable with said semaphore, a main contact engaged by said bridge strip and connected with one of the contacts engageable by said bridging strip and connected with the second contact of the track element, a resistance being provided between the second contact of the track element and one of the last mentioned contacts, and a train device comprising electrically operated indicators, energizing circuits for the indicators, switch means for the circuits, resilient means yieldably holding the switch means against movement in one direction, the resilient means of one switch being stronger than the other, electrically operated means for moving said switch means having an energizing circuit including spaced contacts for engaging the contacts of the track element, and means for releasably holding the switches against return movement by said resilient means after being moved by the electrically operated means, spaced contacts in one circuit bridged by the switch means of the second circuit when said switch is open, electrically operated means for moving the switches to a closed position having an energizing circuit including spaced contacts for engaging the contacts of the track element, and spring means yieldably holding the switches open, the spring means of the switch for bridging said contacts having sufficient strength to hold the switch in an open position when the switch energizing circuit is closed and current is passing through the resistance.

3. A safety device including a semaphore, a track element including insulated contacts, a bridging strip movable with said semaphore, a main contact engaged by said bridge strip and connected with one of the contacts of the track element, insulated contacts engageable by said bridging strip and connected with the second contact of the track element, a resistance being provided between the second contact of the track element and one of the last mentioned contacts, and a train device comprising electrically operated indicators, energizing circuits for the indicators. each including spaced contacts and one having an extra set of spaced contacts adjacent the contacts of the circuit for the other indicator, bridging means for engaging the spaced contacts of said energizing circuits, electromagnets for imparting movement to said bridging means, an energizing circuit for said means including spaced contacts for engaging the spaced contacts of said track element, spring means yieldably holding the bridging means against movement to an operative position, the spring means of the bridging means engaging the extra set of contacts being stronger than the spring means of the other bridging means, and means for releasably holding the bridging means in a set position.

4. A safety device including a semaphore arm and pole, a contact connecting bridge carried by and movable with the semaphore arm, an arcuate contact engaged by said bridge, arcuate contacts engageable by said bridge and concentric with the first contact, a track element including a contact having a conductor leading to the first contact of the semaphore and a second contact having conductors leading to the second contacts of the semaphore, one of the last mentioned conductors having a resistance element associated therewith, a signal including electrically operated indicators, circuits for the indicators each including spaced contacts and bridging means for connecting its spaced contacts and one including a second set of spaced contacts bridged by the bridging means of the other circuit when out of bridging engagement with its own spaced contacts, electro-magnets for moving said bridging means into operative engagement with the spaced contacts of their respective circuits and having an energizing circuit including spaced contacts for engaging the contacts of the rail element, and means yieldably holding the bridging means in the inoperative position and preventing movement of one of the bridging means when current is passing through said resistance.

5. A safety device comprising an electrically operated indicator, a second electrically operated indicator, an energizing circuit for the first indicator including a normally open switch element, an energizing circuit for the second indicator including a normally open switch and spaced contacts adjacent the switch of the first circuit and bridged thereby when the switch of the first circuit is open, electrically operated switch closing means including an energizing circuit having spaced contacts for engaging spaced contacts of a completing circuit including a switch operated from a semaphore and conductors leading therefrom to the last mentioned contacts, a resistance positioned in one of the conductors, and spring means yieldably holding the switches of the indicator energizing circuits open, the spring means for the switch bridging the spaced contacts of the second indicator circuit having sufficient strength to prevent movement of the switch out of bridging engagement with the spaced contacts when current is passing through the resistance.

6. A safety device comprising an electrically operated indicator, a second electrically operated indicator, an energizing circuit for the first indicator including a normally open switch element, an energizing circuit for the second indicator including a normally open switch and spaced contacts adjacent the switch of the first circuit and bridged thereby when the switch of the first circuit is open, electrically operated switch closing means including an energizing circuit having spaced contacts for engaging spaced contacts of a completing circuit including a switch operated from a semaphore and conductors leading therefrom to the last mentioned contacts, and spring means for yieldably holding the switches of the energizing circuits open the spring means for the switch bridging the spaced contacts of the second indicator circuit having sufficient strength to prevent closing of the switch when a reduced current is passed through the energizing circuit of the switch operating means.

7. In a safety device, a train element including an electrically operated indicator, an energizing circuit for the indicator including spaced stationary contacts, a moveable contact for bridging the stationary contacts including a slidably mounted stem portion having contact engaging arms extending therefrom, an electro-magnet for moving the movable contact into engagement with the stationary contacts, means yieldably holding the movable contact against movement towards the stationary contacts, an energizing circuit for the electro-magnet including spaced contacts for engaging spaced contacts of a completing station circuit having a switch element moved with a semaphore, and a second indicator having an energizing circuit including spaced contacts adjacent the spaced contacts of the circuit for the first indicator and bridged by the arms of the movable contact when the contact is out of engagement with the spaced stationary contacts of its circuit, a switch for the circuit of the second indicator yieldably held in an open position, and an electro-magnet for said switch in circuit with the electro-magnet of the first indicator.

8. The structure of claim 6 having each of the switches of the indicator energizing circuits comprising a slidably mounted stem, arms extending from the stem for engaging the spaced contacts, arms extending from the stem for attraction by the magnets, springs upon said stems, and units upon said stems engaging and compressing the spring.

9. The structure of claim 6 having each of the switches of the indicator energizing circuits comprising a slidably mounted stem, arms extending from the stem for engaging the spaced contacts, arms extending from the stem for attraction by the magnets, a latch pivotally mounted and having a pawl portion for engaging teeth of said stem, a handle portion for said latch, a spring connected with said handle, and a spring yieldably holding the stem against upward movement.

10. The structure of claim 6 having the completing circuit comprising a track element including insulated sections, a pivoted semaphore arm, a bridge strip carried by and moving with the semaphore arm, a bracket mounted adjacent the semaphore arm with said bridge strip extending across the bracket, a contact mounted upon and insulated from the bracket and at all times engaged by said bridge, a conductor connecting the contact and one section of the track element, other contacts mounted upon and insulated from said bracket, and conductors connecting the last mentioned contacts with the other section of the track element, one of the last mentioned conductors having a resistance intermediate its length.

In testimony whereof I have hereunto set my hand.

HARRY C. EIGABROADT.